(12) United States Patent
Fukasawa

(10) Patent No.: US 11,554,666 B2
(45) Date of Patent: Jan. 17, 2023

(54) DISPLAY CONTROL DEVICE

(71) Applicant: TOYOTA JIDOSHA KABUSHIKI KAISHA, Toyota (JP)

(72) Inventor: Koichi Fukasawa, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 256 days.

(21) Appl. No.: 16/574,584

(22) Filed: Sep. 18, 2019

(65) Prior Publication Data

US 2020/0156472 A1 May 21, 2020

(30) Foreign Application Priority Data

Nov. 15, 2018 (JP) .............................. JP2018-214666

(51) Int. Cl.
*B60K 35/00* (2006.01)

(52) U.S. Cl.
CPC ........ *B60K 35/00* (2013.01); *B60K 2370/178* (2019.05); *B60K 2370/195* (2019.05); *B60K 2370/563* (2019.05)

(58) Field of Classification Search
None
See application file for complete search history.

(56) References Cited

U.S. PATENT DOCUMENTS

| 9,079,498 B2 * | 7/2015 | Small ..................... B60K 37/06 |
| 2008/0309475 A1 | 12/2008 | Kuno et al. |
| 2011/0163864 A1 | 7/2011 | Watanabe et al. |
| 2013/0274998 A1 | 10/2013 | Kato et al. |
| 2015/0234665 A1 * | 8/2015 | Matsuyuki ............. B60K 35/00 701/36 |
| 2016/0205516 A1 | 7/2016 | Choi et al. |
| 2016/0337822 A1 * | 11/2016 | Kim ........................ H04W 4/12 |
| 2017/0008452 A1 * | 1/2017 | Kajita ...................... B60Q 9/00 |
| 2017/0203653 A1 | 7/2017 | Ogasawara et al. |
| 2017/0282717 A1 * | 10/2017 | Jang .................... G06F 3/04817 |
| 2018/0093611 A1 * | 4/2018 | Kim ......................... B60R 1/00 |

(Continued)

FOREIGN PATENT DOCUMENTS

| CN | 106660498 A | 5/2017 |
| JP | 2005-227987 A | 8/2005 |

(Continued)

*Primary Examiner* — Navid Z. Mehdizadeh
(74) *Attorney, Agent, or Firm* — Oblon, McClelland, Maier & Neustadt, L.L.P.

(57) ABSTRACT

A display control device is mounted on a vehicle and is configured to control display of information on a display device. The display control device includes an electronic control unit that determines whether there is information to be displayed on the display device, determines whether a predetermined first condition to determine that a driving operation by a user is not required is satisfied, determines whether a predetermined second condition to determine that the driving operation by the user is required is satisfied, controls the display device such that the display device displays the information when it is determined that there is information to be displayed on the display device and that the first condition is satisfied, and controls the display device such that the display device hides the information when it is determined that the second condition is satisfied.

8 Claims, 6 Drawing Sheets

(56) References Cited

U.S. PATENT DOCUMENTS

2019/0204827 A1* 7/2019 Bhalla .................. G05D 1/0061
2019/0378475 A1   12/2019 Lim et al.

FOREIGN PATENT DOCUMENTS

| JP | 2009-281991 A | 12/2009 |
| JP | 2010-277015 A | 12/2010 |
| JP | 2013-115769 A | 6/2013 |
| JP | 2013-221769 A | 10/2013 |
| JP | 2014-010775 A | 1/2014 |
| JP | 2016-022898 A | 2/2016 |
| JP | 2016-22919 A | 2/2016 |
| JP | 2018-140714 A | 9/2018 |
| WO | WO 2018/131908 A1 | 7/2018 |

* cited by examiner

DISPLAY CONTROL DEVICE

INCORPORATION BY REFERENCE

The disclosure of Japanese Patent Application No. 2018-214666 filed on Nov. 15, 2018 including the specification, drawings and abstract is incorporated herein by reference in its entirety.

BACKGROUND

1. Technical Field

The present disclosure relates to a display control device.

2. Description of Related Art

A technology for connecting a mobile terminal, such as a smartphone, to an in-vehicle device, performing an application on the mobile terminal, and displaying an image generated by the application on the screen of the in-vehicle device is known. However, with the technology, since a driver fixates on the screen while a vehicle is traveling, there is a possibility that the safety of driving is impaired.

Japanese Unexamined Patent Application Publication No. 2013-221769 (JP 2013-221769 A) discloses a method of displaying a screen only while a vehicle is stopped and designating a screen as a non-display area to be obscured from view when the vehicle is in a traveling state in order to prevent a driver from fixating on the screen while the vehicle is traveling. In addition, Japanese Unexamined Patent Application Publication No. 2016-022919 (JP 2016-022919 A) discloses a method of switching a screen display, taking into consideration condition of a driver or a vehicle, or the traveling environment such that an amount of information displayed on the screen does not affect driving even when the driver reads it.

SUMMARY

With the methods disclosed in JP 2013-221769 A and JP 2016-022919 A, it is possible to prevent the driver from fixating on the screen while the vehicle is traveling. However, there can be a situation, for example, in which a driver is fixating on a screen while the vehicle is stopped at a red light, not aware of the fact that the traffic light has turned green, and thus may not be able to start the vehicle when he or she should. Although there is also a method of notifying a driver with a buzzer or the like by detecting, with a sensor or a camera provided in the vehicle, a situation to start the vehicle, it bothers the driver when repeatedly informed by the buzzing sound. Therefore, there is room for improvement.

The present disclosure provides a display control device that can control display of information on a screen depending on a situation.

A display control device according to an aspect of the present disclosure is mounted on a vehicle and controls display of information on a display device. The display control device includes an electronic control unit configured to determine whether there is information to be displayed on the display device, determine whether a predetermined first condition to determine that a driving operation by a user is not required is satisfied, determine whether a predetermined second condition to determine that the driving operation by the user is required is satisfied, controls the display device such that the display device displays the information to be displayed when it is determined that there is information to be displayed on the display device and that the first condition is satisfied, and controls the display device such that the display device hides the information to be displayed when it is determined that the second condition is satisfied.

When determining that there is information to be displayed on the display device and that the first condition is satisfied, the electronic control unit may control the display device such that the display device displays the information to be displayed by securing an area in which the information to be displayed is displayed. The electronic control unit may control the display device such that the display device expands the area with time when the area is secured.

When determining that there is information to be displayed on the display device and controls the display device such that the display device hides the information to be displayed, the electronic control unit may control the display device such that the display device displays an image for notifying the user that there is information to be displayed.

When controlling the display device such that the display device displays the information to be displayed, the electronic control unit may select the information to be displayed on the display device from among a plurality of pieces of information in response to an operation of the user.

The display device may be an in-vehicle display device mounted on the vehicle.

The display device may be a mobile terminal of a user, and the mobile terminal is configured to be connected to the display control device via communication.

When at least one of cases in which the vehicle is stopped, driven autonomously, and performing adaptive cruise control is established, the electronic control unit may determine that the first condition is satisfied.

When at least one of cases in which a preceding vehicle of the vehicle is started while the vehicle is stopped, a traffic signal changes to a display permitting the vehicle to proceed, and the vehicle is changed to a travelable state by the user's operation is established, the electronic control unit may determine that the second condition is satisfied.

When determining that the second condition is satisfied, the electronic control unit may control the display device such that the display device displays an image prompting attention of the user.

With the foregoing aspect of the present disclosure, it is possible to provide a display control device that can control a display of information on a screen depending on a situation.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A display control device according to one embodiment of the present disclosure controls a display device such that the display device displays information in a situation in which a driving operation on a vehicle is not required, such as, while the vehicle is stopped or being autonomously driven, and controls the display device such that the display device hides information to be displayed in a situation in which it is considered that the driving operation is required and while the vehicle is traveling. As such, it is possible to prevent a driver from fixating on a screen while the vehicle is traveling, and further, to make the driver realize that the driving operation becomes to be required even though the driver is fixating on the screen display in a situation in which the driving operation is not required, such as, while the vehicle is stopped.

Embodiment

Hereinafter, an embodiment of the present disclosure will be described in detail with reference to the drawings.

Configuration

Figure 1:
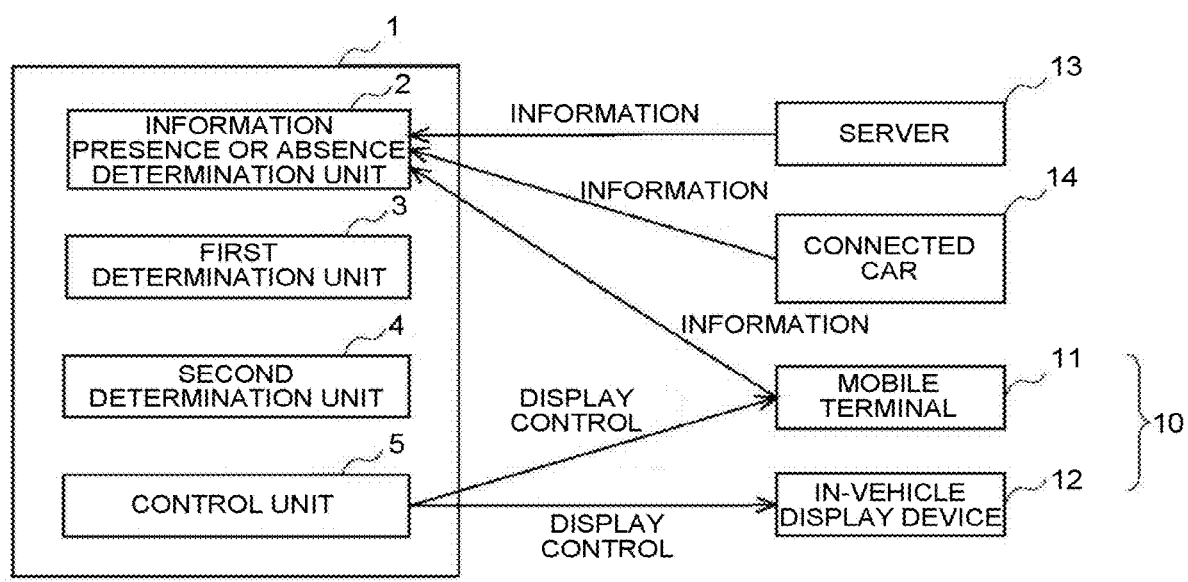
FIG. 1 illustrates a functional block diagram of a display control device according to one embodiment of the present disclosure.

FIG. 1 illustrates a functional block diagram of a display control device according to one embodiment of the present disclosure. The display control device 1 includes an information presence or absence determination unit 2, a first determination unit 3, a second determination unit 4, and a control unit 5. The display control device 1 is configured as an electronic control unit (ECU), and the information presence or absence determination unit 2, the first determination unit 3, the second determination unit 4, and the control unit 5 are implemented by the ECU. The display control device 1 is mounted on a vehicle, and performs control to display on or hide from the display device 10, the information to be displayed when receiving notification from another device that there is information to be displayed on the display device 10. Examples of the another device include a mobile terminal 11 owned by a user, a server 13 of a provider who performs an information provision service and the like, and a connected car 14 having a vehicle-to-vehicle communication function. The display device 10 is the mobile terminal 11 of the user or an in-vehicle display device 12 mounted on the vehicle, which is display-controlled by the control unit 5. Specifically, the in-vehicle display device 12 is a head-up display (HUD), a meter panel, a car navigation device, or the like. Specifically, the mobile terminal 11 is a smartphone of the user or the like.

The information presence or absence determination unit 2 determines whether the another device communicably connected thereto has information to be displayed on the display device 10. Examples of the information to be displayed on the display device 10 include posts on social media, news, messages, traffic information, and information from the connected car. The information to be displayed on the display device 10 includes text to which the user is required to pay attention to read. The information presence or absence determination unit 2 and the another device may communicate with each other via wired or wireless communication. A communication method therebetween is not limited.

The first determination unit 3 determines whether a predetermined first condition to determine that the driving operation by the user is not required is satisfied. The first determination unit 3 performs the determination based on information on the vehicle condition or the surrounding situation acquired from various sensors, a camera, and the like, provided in the vehicle. Details of the first condition will be described below.

The second determination unit 4 determines whether a predetermined second condition to determine that the driving operation by the user is required is satisfied. The second determination unit 4 performs the determination based on information on the vehicle condition or the surrounding situation acquired from the various sensors, the camera, and the like, provided in the vehicle. Details of the second condition will be described below.

The control unit 5 controls a display of an image on the display device 10 based on the determination results of the information presence or absence determination unit 2, the first determination unit 3, and the second determination unit 4. Specifically, when the information presence or absence determination unit 2 determines that there is information to be displayed on the display device 10, the control unit 5 performs control to enable the display device 10 to display the information or to hide the information. When the information presence or absence determination unit 2 determines that there is information to be displayed on the display device 10 and the first determination unit 3 determines that the first condition is satisfied, the control unit 5 may control the display device 10 such that the display device 10 displays, by securing an area to display the information on the screen of the display device 10, the information on the area. In addition, even though the information presence or absence determination unit 2 determines that there is information to be displayed on the display device 10, the control unit 5 causes the display device 10 to display an image, such as an icon, for notifying the user that there is information to be displayed on the display device 10 as long as the first determination unit 3 determines that the first condition is not satisfied. Moreover, when there is a plurality of pieces of information to be displayed on the display device 10, the control unit 5 can select, in response to an operation of the user, specific information from among the plurality of pieces of information displayed on the display device 10, or cause the display device 10 to display details of the information.

The control unit 5 may control one of the mobile terminal 11 and the in-vehicle display device 12, or simultaneously control both of them. Further, the number of display devices 10 to be controlled is not limited to one or two, and may be three or more.

Control Process

Figure 2:
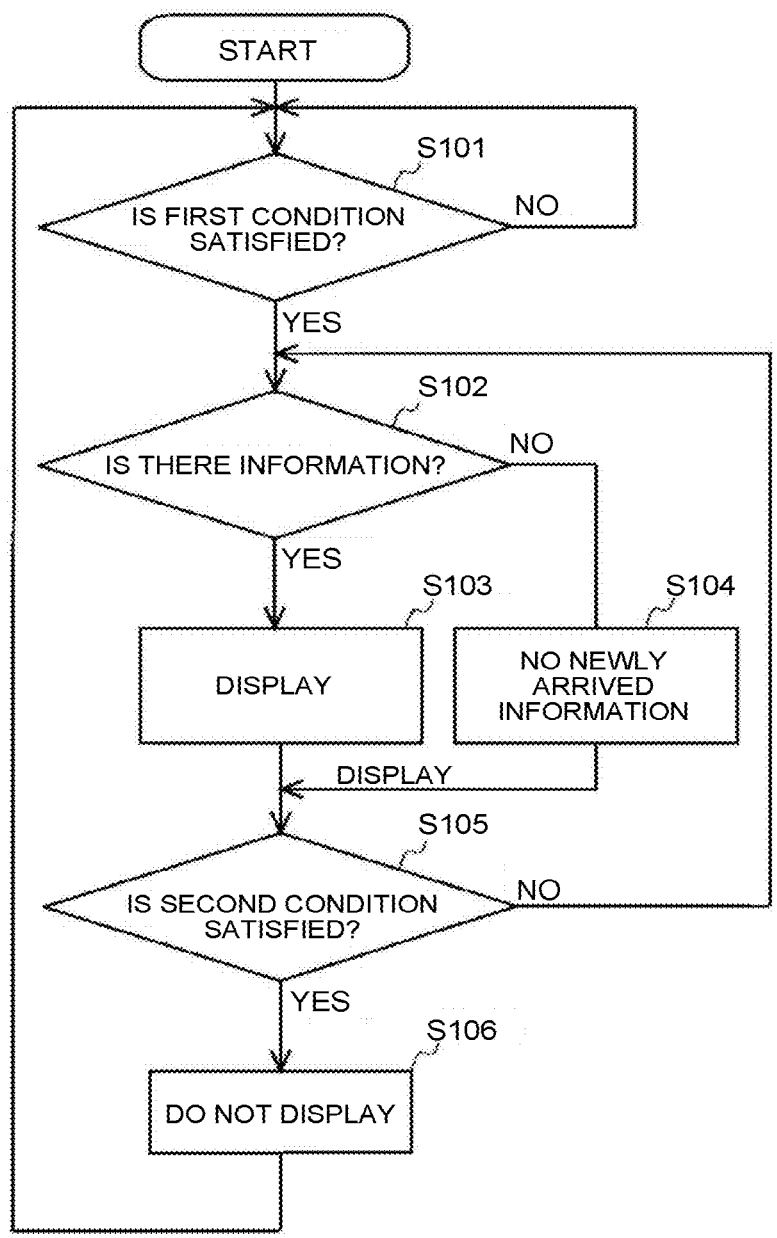
FIG. 2 is a flowchart illustrating a control process of displaying and hiding a display on a display device according to one embodiment of the present disclosure.

The display control of the display device 10 performed by the display control device 1 will be described with reference to FIGS. 1 to 3. FIG. 2 is a flowchart illustrating a control process of displaying and hiding a display on the display device 10. The flow of FIG. 2 starts when the ignition of the vehicle is turned on (IG-ON), and is repeatedly performed until the ignition is turned off.

Step S101: The first determination unit 3 determines whether the first condition is satisfied. The first condition is to determine whether it is a situation in which the user can safely read the information when the information acquired by the information presence or absence determination unit 2 is displayed on the display device 10. The situation in which the user can safely read the information is, for example, when the user is not required to perform the driving operation. Specifically, it may be when the vehicle is stopped or being autonomously driven. Specifically, the case in which vehicle is stopped includes when the vehicle is stopped following its preceding vehicle that is stopped, when a traffic signal is in the state of not permitting the vehicle to proceed (for example, a red light), when the vehicle is stopped at a parking lot, on the shoulder of a road, and the like. The case in which the vehicle is being autonomously driven refers to, for example, when the vehicle is driven at an autonomous driving level 3 or higher defined by the Society of Automotive Engineers of Japan, Inc. In such a case, since an autonomous driving system performs all operation on the vehicle, the driving operation by the user is not required. In addition, in a case in which adaptive cruise control (ACC) is being performed while the vehicle is traveling on an expressway, when condition, such as straight roads and good weather, is satisfied, it may be considered that the user is not required to check the surrounding conditions or perform the driving operation. If it is determined that the predetermined first condition is satisfied (YES in S101), the process proceeds to step S102. Otherwise (NO in S101), the process repeats step S101.

Step S102: The information presence or absence determination unit 2 determines whether there is information to be displayed on the display device 10. The information presence or absence determination unit 2 may determine whether there is information to be displayed on the display device 10 by inquiring of the another device whether there is information to be displayed, or based on a notification from the another device that there is information to be displayed. When the information presence or absence determination unit 2 determines that there is information to be displayed on the display device 10 (YES in S102), the process proceeds to step S103. Otherwise (NO in S102), the process proceeds to step S104.

Step S103: The control unit 5 performs control to make the display device 10 in a displayable state where the display device 10 can display the information to be displayed. The displayable state refers to a state in which the information is displayed so that the user can read the content of the information. The displayable state includes a state in which the content of the information is actually displayed on the display device 10, and a state in which the content of the information is currently not displayed on the display device 10 but can be displayed in response to an operation of the user, or the like. The control unit 5 may control the display device 10 such that the display device 10 displays the information immediately after it is determined as YES in step S102, or control the display device 10 such that the display device 10 displays the information in response to the user's operation after it is determined as YES in step S102. The control unit 5 may control the display device 10 such that the display device 10 expands the area in which the information is displayed on the display device 10 with time, or control the display device 10 such that the display device 10 displays the information on the entire area of the screen instantaneously. In addition, after it is determined as YES in step S101 and before it is determined as YES in step S102, in step S104, when a notification that there is no information to be displayed is displayed, the control unit 5 hides the notification, and then enables the display device 10 to display the information. Further, when an icon has been displayed in the process of FIG. 3 to be described below, the control unit 5 hides the icon, and then enables the display device 10 to display the information. Thereafter, the process proceeds to step S105.

Step S104: To notify the user that there is no information to be displayed, the control unit 5 performs control to display text or an image, such as "no newly arrived information", on the display device 10, and proceeds to step S105.

Step S105: The second determination unit 4 determines whether the second condition is satisfied. The second condition is to determine whether the situation requires the driving operation. The second condition to be satisfied in this step corresponds to the predetermined first condition that is satisfied by the vehicle in step S101. Specifically, when the first condition satisfied by the vehicle is that the vehicle is stopped following the preceding vehicle that is stopped, a corresponding second condition to be satisfied is the start of the preceding vehicle. For example, when the start of the preceding vehicle is detected while the shift lever of the vehicle is on Drive and the vehicle is stopped (vehicle speed zero or brake ON), it can be determined that the second condition is satisfied. The start of the preceding vehicle can be detected based on a difference image of the preceding vehicle, the distance to the preceding vehicle, and a relative speed. When the first condition satisfied by the vehicle is no permission to proceed by the traffic signal, a corresponding second condition to be satisfied is permission to proceed by the traffic signal. Here, when the traffic signal is changed to the state of permission to proceed (for example, a green light) from the state of no permission to proceed (for example, a red light) and the state in which the vehicle is stopped, it can be determined that the second condition is satisfied. The change of the traffic signal can be detected by a change in an image of the traffic signal. When the first condition satisfied by the vehicle is that the vehicle is parked at a parking lot or on the shoulder of the road, the second condition to be satisfied is that the vehicle is changed to a travelable state by the user's operation. Here, when the shift lever of the vehicle is on Drive and the brake is off, it can be determined that the second condition is satisfied. When the first condition satisfied by the vehicle is autonomous driving of the vehicle, a corresponding second condition to be satisfied is cancellation of the autonomous driving of the vehicle. Here, when the autonomous driving system determines based on the traffic or weather conditions that it is difficult to continue the autonomous driving and cancels it, or when the user himself or herself cancels it, it can be determined that the second condition is satisfied. When it is determined that the second condition is satisfied (YES in S105), the process proceeds to step S106. Otherwise (NO in S105), the process returns to step S102.

Step S106: The control unit 5 controls the display device 10 such that the display device 10 hides the display of the information, and the process returns to step S101. Specifically, when the control unit 5 causes the display device 10 to display information to be readable in step S103, the control unit 5 changes the display on the display device 10 so that the information cannot be read. Meanwhile, when a notification that there is no newly arrived information is continuously displayed after the control unit 5 causes the display device 10 to display the notification in step S104, the control unit 5 changes the notification to be hidden. When the control unit 5 changes the notification to be hidden, the control unit 5 may control the display device 10 such that the display device 10 reduces the area in which the information is displayed on the display device 10 with time, or control the display device 10 such that the display device 10 hides the entire area of the screen instantaneously. When there remains information that has not been read by the user, the control unit 5 performs control to hide the display of the information from the display device 10, and then cause the display device 10 to display the image, such as the icon 21, indicating that there is the information to be displayed. As such, it is possible to notify the user that there is information to be displayed.

Figure 3:
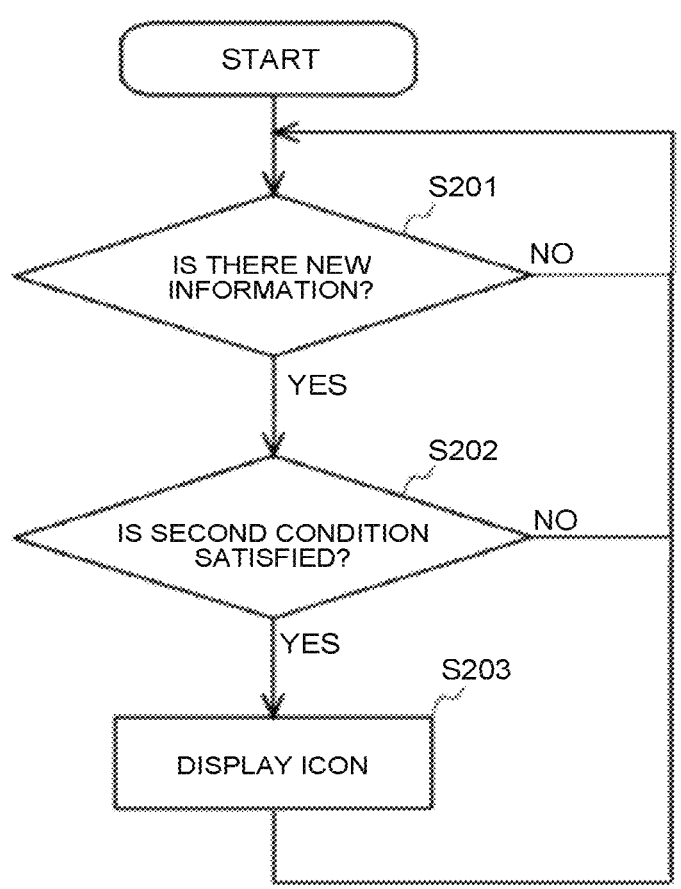
FIG. 3 is a flowchart illustrating a process of confirming whether there is information to be displayed according to one embodiment of the present disclosure.

FIG. 3 is a flowchart illustrating a process of confirming whether there is information to be displayed. The flow of FIG. 3 starts when the ignition of the vehicle is turned on (IG-ON) and is repeatedly performed until the ignition is turned off. However, the flow of FIG. 3 is not performed from the time when a determination of YES is made in step S101 of FIG. 2 to the time when a determination of YES is made in step S105.

Step S201: The control unit 5 determines whether there is information (newly arrived information or unread information) to be displayed. When it is determined that there is information to be displayed (YES in S201), the process proceeds to step S202. Otherwise (NO in S201), the process repeats step S201.

Step S202: The second determination unit 4 determines whether the second condition is satisfied. The second condition is the same as the condition determined by the second determination unit 4 in step S105 of FIG. 2. When it is determined that the second condition is satisfied (YES in S202), the process proceeds to step S203. Otherwise (NO in S202), the process returns to step S201.

Step S203: The control unit 5 performs control to display the icon 21 to notify the user that there is information to be displayed, and the process returns to step S201.

Exemplified Displays

Next, screen change that occurs along with display control of the screen on the display device 10, will be described with reference to FIGS. 4 and 5. First, a case in which the display device 10 is the in-vehicle display device 12 will be described. FIGS. 4A to 4D are exemplified displays on the in-vehicle display device according to one embodiment of the present disclosure.

Figure 4A:
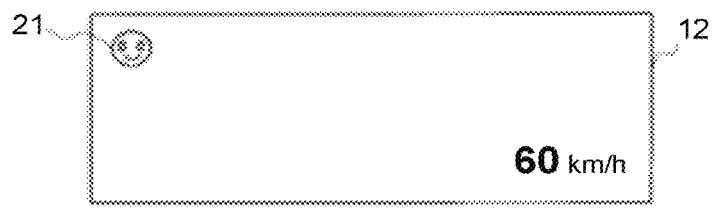
FIG. 4A is an exemplified display on an in-vehicle display device according to one embodiment of the present disclosure.

FIG. 4A is a screen of the in-vehicle display device 12 when there is information to be displayed and the first determination unit 3 determines that the first predetermined condition is not satisfied. In FIG. 4A, as an example of a case in which the first condition is not satisfied, it is assumed that the vehicle is traveling. Further, the in-vehicle display device 12 is specifically assumed to be an HUD. When there is information to be displayed on the in-vehicle display device 12, the icon 21 is displayed on the upper left portion of the in-vehicle display device 12, as illustrated in FIG. 4A. Although FIG. 4A illustrates an example in which the icon 21 is displayed, it is not limited to the icon 21. An image may be displayed as long as it can notify the user that there is information to be displayed. The image may be composed only of figures, pictures, numbers, and characters, or appropriately combined with the above elements and colors. Further, the icon 21 may be changed depending on the number or importance of the information to be displayed.

Figure 4B:
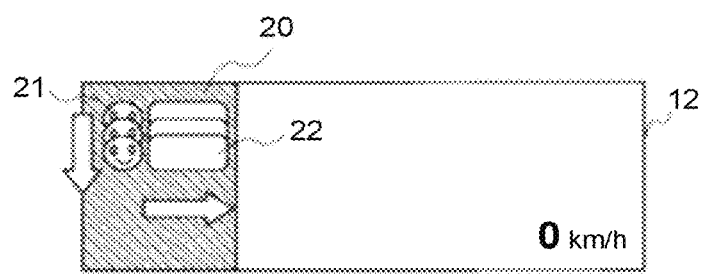
FIG. 4B is another exemplified display on the in-vehicle display device according to one embodiment of the present disclosure.
Figure 4C:
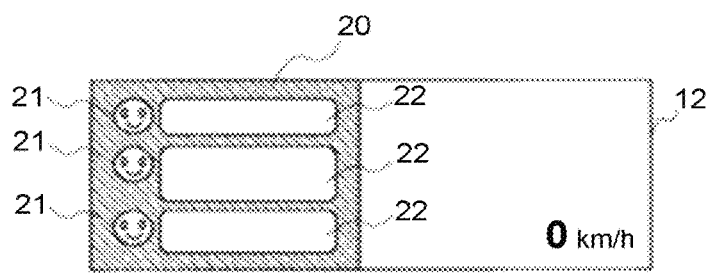
FIG. 4C is yet another exemplified display on the in-vehicle display device according to one embodiment of the present disclosure.

For example, when it is determined that the first condition is satisfied because the vehicle is stopped at a red light, the control unit 5 performs control to display the area 20 in which information is displayed on the in-vehicle display device 12, and to change the content 22 of the information to be in the displayable state, as illustrated in FIG. 4B. Here, the area 20 may be expanded with time toward the right side of the in-vehicle display device 12, since it is possible to visually notify the user that the content 22 of the information can be read. Further, when there is a plurality of pieces of information to be displayed, the plurality of pieces of information may be displayed in the manner that they are spread and arranged in the longitudinal direction on the in-vehicle display device 12, as illustrated in FIG. 4B. A state in which the content 22 of information is readable in FIG. 4B is illustrated in FIG. 4C. FIG. 4C illustrates a state in which the area 20 to display the information in FIG. 4B is completely expanded, and each piece of the content 22 of the information is readable. When there is a plurality of pieces of information and there is not enough room to display all of the plurality of pieces of information on the screen of the in-vehicle display device 12, it is possible to appropriately display the plurality of pieces of information readable by scrolling in response to a switch operation or voice operation of the user, thereby appropriately displaying the information. Further, when the user selects one piece of the information displayed on the in-vehicle display device 12, the details of the selected piece of information can be displayed.

Figure 4D:
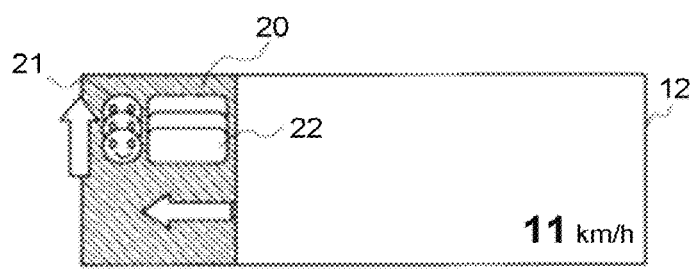
FIG. 4D is still yet another exemplified display on the in-vehicle display device according to one embodiment of the present disclosure.
Figure 4E:
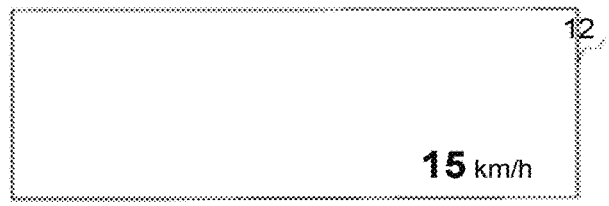
FIG. 4E is an exemplified display on the in-vehicle display device according to one embodiment of the present disclosure.

Next, for example, when it is determined that the second condition is satisfied because the traffic signal has changed from a red light to a green light, the control unit 5 performs control to reduce the area 20 in which the information is displayed on the in-vehicle display device 12, as illustrated in FIG. 4D, and to hide the content of 22 of the information as illustrated in FIG. 4E. In addition, in the example illustrated in FIG. 4E, the icon 21 is not displayed because the user has read all the information while the vehicle is stopped, and as a result, there is no unread information. When there is the unread information, the icon 21 may be displayed to change the screen back to the state of FIG. 4A.

Figure 5A:
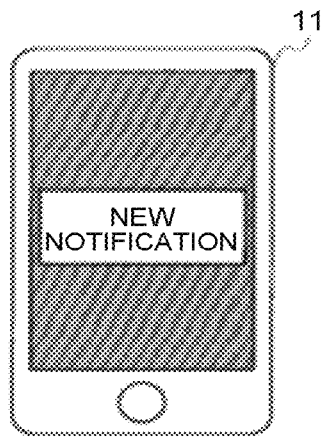
FIG. 5A is an exemplified display on a mobile terminal according to one embodiment of the present disclosure.
Figure 5B:
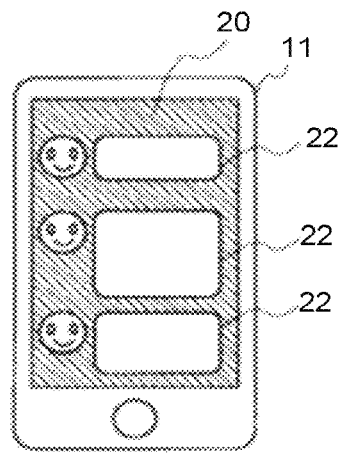
FIG. 5B is another exemplified display on the mobile terminal according to one embodiment of the present disclosure.
Figure 5C:
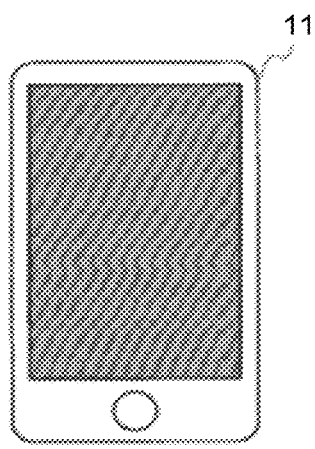
FIG. 5C is yet another exemplified display on the mobile terminal according to one embodiment of the present disclosure.

Next, a case in which the display device 10 is the mobile terminal 11 will be described. FIGS. 5A to 5C are exemplified displays on the mobile terminal according to one embodiment of the present disclosure. The display control of the mobile terminal 11 is performed in a state where the screen is not locked.

FIG. 5A is a screen of the mobile terminal 11 in a case in which there is information to be displayed and the first determination unit 3 determines that the first condition is not satisfied. The mobile terminal 11 is, for example, a smartphone owned by the user. FIG. 5A is an example of a case in which the first condition is not satisfied, and it is assumed that the vehicle is traveling. When the information presence or absence determination unit 2 determines that there is information to be displayed, the control unit 5 notifies of newly arrived information as illustrated in FIG. 5A, in the same manner as when a notification is sent on a smartphone.

For example, when it is determined the first condition is satisfied because the vehicles is stopped at a red light, the control unit 5 performs control to display the area 20 in which information is displayed on the screen of the mobile terminal 11, and to change the content 22 of the information to be in the displayable state, as illustrated in FIG. 5B.

Next, for example, when it is determined that the second condition is satisfied because the traffic signal has changed from a red light to a green light, the control unit 5 performs control to close the area 20 in which formation is displayed on the mobile terminal 11 and to hide the information, as illustrated in FIG. 5C. Thereafter, when information to be displayed is newly generated, the screen is changed back to the state of FIG. 5A.

Advantageous Effect

As described above, the display control device 1 according to one embodiment of the present disclosure performs control to make information on the display device 10 displayable when a driving operation is not required, such as, while the vehicle is stopped or autonomously driven, and to make information on the display device non-visible when the situation is changed to states in which driving is required or the vehicle is traveling.

As such, it is possible to prevent the user from fixating on the display device 10 while the vehicle is traveling, and further, to enable the user to realize that the driving operation is required even though the driver is fixating on the display device 10 in a situation in which the driving operation is not required, such as, while the vehicle is stopped.

When there is information to be displayed and the user can safely read the information, the control unit 5 controls the display device 10 such that the display device 10 expands the area 20 in which information is displayed with time.

As such, the user can visually recognize that he or she can read the information.

When there is information to be displayed and the control unit 5 performs control to hide the information to be displayed, the control unit 5 causes the display device 10 to display the icon 21 for notifying the user that there is information to be displayed.

As such, even when the information is hidden from the screen by control, the user can realize whether there is information to be displayed.

When the control unit 5 makes the information to be displayed displayable, the control unit 5 enables the information to be displayed on the display device 10 to be selected in response to the user's operation.

As such, the user can select only the information that he or she desires to read.

The display device 10 is an in-vehicle display device 12 mounted on the vehicle.

As such, the user can read the information without significantly changing the posture or the viewpoint while driving.

The display device 10 is the mobile terminal 11 of a user communicably connected to the display control device 1.

As such, when the driving operation is required, it is possible to perform control to hide the information from the mobile terminal 11 via the control unit 5, such that safety can be improved.

When one of cases in which the preceding vehicle is started while the vehicle is stopped, the traffic signal changes to a display permitting the vehicle to proceed, and the vehicle is changed to the travelable state by the user's operation is established, it is determined that the second predetermined condition is satisfied.

As such, when the situation surrounding the vehicle driven by the user is considered to require driving, and the vehicle is changed to the travelable state, it is possible to hide the information to be displayed.

Modification

A modification is described with reference to FIG. 6. FIGS. 6A to 6C are diagrams illustrating examples of images prompting attention of a user according to one embodiment of the present disclosure. When the second determination unit 4 determines that the predetermined second condition is satisfied, the image 23 prompting the user's attention is displayed depending on the satisfied condition.

Figure 6A:
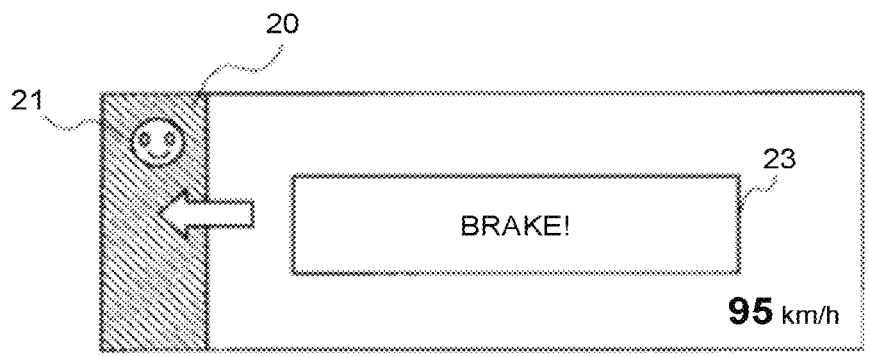
FIG. 6A is a diagram illustrating an example of an image prompting attention of a user according to one embodiment of the present disclosure.

FIG. 6A is a screen of the in-vehicle display device 12 when the vehicle or the surrounding situation satisfies the predetermined second condition and the information to be notified to the user is generated. Specifically, it is a case in which another vehicle suddenly cuts in ahead of a vehicle that is autonomously driven, and the user is required to brake. As illustrated in FIG. 4D, the control unit 5 performs control to reduce the area 20 in which information is displayed on the in-vehicle display device 12 simultaneously with displaying the image 23 prompting the user's attention.

Figure 6B:
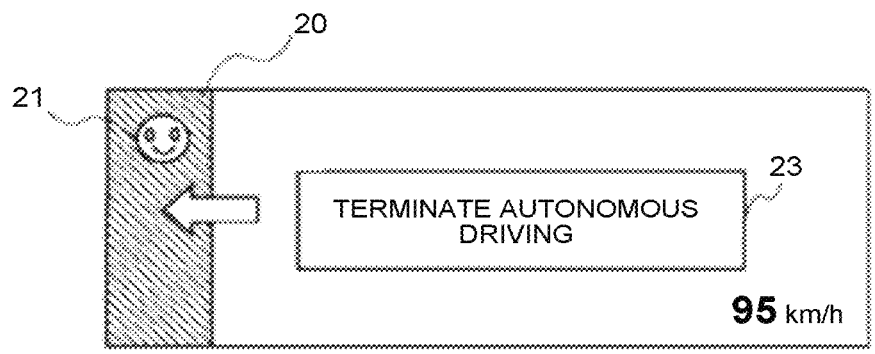
FIG. 6B is another diagram illustrating an example of an image prompting the user's attention according to one embodiment of the present disclosure.

FIG. 6B is a screen of the in-vehicle display device 12 when the vehicle travels into a general road out of an expressway at the autonomous driving level 3. Here, since the autonomous driving is terminated when the vehicle travels out of the expressway, a notification that the autonomous driving is terminated is displayed as the image 23, prompting the user's attention.

Figure 6C:
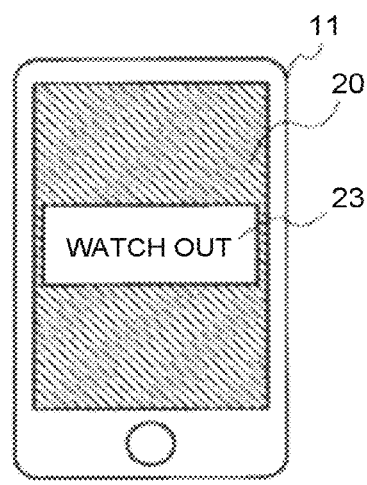
FIG. 6C is yet another diagram illustrating an example of an image prompting the user's attention according to one embodiment of the present disclosure.

FIG. 6C displays an image 23 prompting the user's attention, to notify the user that the preceding vehicle is started while the vehicle is stopped following the preceding vehicle that is stopped. As such, the image 23 may be displayed on the mobile terminal 11 to prompt the user's attention in a similar manner as in the case of the in-vehicle display device 12.

For the display of the image 23 prompting the user's attention, a process for displaying the image 23 prompting the user's attention on the display device 10 is added to step S106 in the flow of FIG. 2. After being displayed, the image 23 prompting the user's attention may be hidden after a predetermined time. The content of the information to be notified to the user can be determined depending on, for example, the vehicle state and the situation surrounding the vehicle, acquired from various sensors, cameras, and the like mounted on the vehicle, and the user's situation.

Advantageous Effect

When it is determined that the vehicle and the surrounding situation satisfy the predetermined second condition, the image 23 prompting the user's attention is displayed on the display device 10.

As such, the user can swiftly realize an operation to be performed or the state of the vehicle.

The present disclosure can be regarded as a computer and program having a display control function, or a vehicle as well as a display control device.

The present disclosure is useful to a display control device mounted on a vehicle or the like.

What is claimed is:

1. A display control device mounted on a vehicle and configured to control display of information on a display device, the display control device comprising:
   an electronic control unit configured to:
   determine whether there is information to be displayed on the display device;

determine whether a predetermined first condition to determine that a driving operation by a user is not required is satisfied;

determine whether a predetermined second condition to determine that the driving operation by the user is required is satisfied;

control the display device such that the display device displays the information to be displayed when it is determined that there is information to be displayed on the display device and that the first condition is satisfied; and control the display device such that the display device hides the information to be displayed when it is determined that the second condition is satisfied, wherein the electronic control unit is configured to determine that the second condition is satisfied when a preceding vehicle of the vehicle is started while the vehicle is stopped.

2. The display control device according to claim 1, wherein:

the electronic control unit is configured to, when determining that there is information to be displayed on the display device and that the first condition is satisfied, control the display device such that the display device displays the information to be displayed by securing an area in which the information to be displayed is displayed; and the electronic control unit is configured to control the display device such that the display device expands the area with time when the area is secured.

3. The display control device according to claim 1, wherein the electronic control unit is configured to, when determining that there is information to be displayed on the display device, and controlling the display device such that the display device hides the information to be displayed, control the display device such that the display device displays an image for notifying the user that there is information to be displayed.

4. The display control device according to claim 1, wherein the electronic control unit is configured to, when controlling the display device such that the display device displays the information to be displayed, select the information to be displayed on the display device from among a plurality of pieces of information in response to an operation of the user.

5. The display control device according to claim 1, wherein the display device is an in-vehicle display device mounted on the vehicle.

6. The display control device according to claim 1, wherein the display device is a mobile terminal of the user, and the mobile terminal is configured to be connected to the display control device via communication.

7. The display control device according to claim 1, wherein the electronic control unit is configured to, when at least one of cases in which the vehicle is stopped, driven autonomously, and performing adaptive cruise control is established, determine that the first condition is satisfied.

8. The display control device according to claim 1, wherein the electronic control unit is configured to, when determining that the second condition is satisfied, control the display device such that the display device displays an image prompting attention of the user.

* * * * *